(12) United States Patent
Moriya et al.

(10) Patent No.: US 11,007,876 B2
(45) Date of Patent: May 18, 2021

(54) VEHICLE

(71) Applicant: SUBARU CORPORATION, Tokyo (JP)

(72) Inventors: Fumiyuki Moriya, Tokyo (JP); Yuta Totsuka, Tokyo (JP); Hidehiro Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 16/689,882

(22) Filed: Nov. 20, 2019

(65) Prior Publication Data
US 2020/0247243 A1 Aug. 6, 2020

(30) Foreign Application Priority Data
Feb. 5, 2019 (JP) .............................. JP2019-018857

(51) Int. Cl.
*B60L 3/04* (2006.01)
*B60L 1/00* (2006.01)
*B60L 53/12* (2019.01)

(52) U.S. Cl.
CPC ................ *B60L 3/04* (2013.01); *B60L 1/006* (2013.01); *B60L 53/12* (2019.02); *B60L 2270/20* (2013.01)

(58) Field of Classification Search
CPC .. B60L 3/04; B60L 53/12; B60L 1/006; B60L 2270/20
USPC .................................................. 307/9.1, 10.1
See application file for complete search history.

(56) References Cited

U.S. PATENT DOCUMENTS

2017/0203656 A1\* 7/2017 Okamoto ................ H02J 7/025

FOREIGN PATENT DOCUMENTS

JP          H08-65815 A          3/1996

\* cited by examiner

*Primary Examiner* — Hal Kaplan
(74) *Attorney, Agent, or Firm* — McGinn IP Law Group, PLLC (57) ABSTRACT

A vehicle includes a battery, an electric power acquirer, a power supply unit, first and second relays, and a controller. The electric power acquirer acquires charging electric power from outside. The power supply unit is able to provide a power supply from the battery to a device other than a traveling motor. The first relay connects and disconnects the battery to and from a power supply line. The second relay connects and disconnects the electric power acquirer to and from the power supply line. The controller changes a switching procedure of the first relay and the second relay, in accordance with a state of use of the power supply unit, at an end of charging of the battery through the electric power acquirer.

10 Claims, 3 Drawing Sheets

VEHICLE

CROSS-REFERENCE TO RELATED APPLICATIONS

This application claims priority from Japanese Patent Application No. 2019-018857 filed on Feb. 5, 2019, the entire contents of which are hereby incorporated by reference.

BACKGROUND

The technology relates to a vehicle including a battery and an electric power acquirer that acquires electric power for battery charging from outside.

Vehicles such as electric vehicles (EV) and plug-in hybrid electric vehicles (PHEV) are equipped with a high-voltage battery. The high-voltage battery has large capacity and accumulates electric power for travel of a vehicle. Sometimes the high-voltage battery is used as a power supply for on-vehicle devices such as an air conditioner and a navigation system. Further, in recent years, utilities have been put into practical use. The utilities are provided for AC power supply from a power receptacle attached inside or outside a vehicle body. The high-voltage battery is also used as a power supply of the utilities.

Such vehicles are able to acquire electric power from an external power supply and to perform charging of the high-voltage battery. Methods of the charging may include non-contact charging and wired charging. The non-contact charging includes acquiring electric power non-contact from a power transmitting coil of ground facilities. The wired charging includes acquiring electric power by wire through a charging connector.

Generally, in vehicles equipped with a high-voltage battery, the high-voltage battery and a power supply line of a system are disconnectable through a system main relay, in order to hinder a voltage of the high-voltage battery from being unduly outputted to the power supply line. Moreover, in vehicles that are able to charge a high-voltage battery from an external power supply, an electric power acquirer and a power supply line are disconnectable through a charging relay, in order to hinder a voltage of the high-voltage battery from being unnecessarily outputted to the electric power acquirer.

Japanese Unexamined Patent Application Publication (JP-A) No. H08-065815 discloses a technique in which, upon an issue of an instruction to prioritize driving an on-vehicle device during charging of a high-voltage battery, the on-vehicle device is driven by part of a charging current, and the battery is charged by a current difference between a maximum output current value of a charger and a current value supplied to the on-vehicle device.

SUMMARY

An aspect of the technology provides a vehicle including a battery, an electric power acquirer, a power supply unit, a first relay, a second relay, and a controller. The battery is configured to accumulate electric power for travel of the vehicle. The electric power acquirer is configured to acquire charging electric power from outside. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The controller is configured to change a switching procedure of the first relay and the second relay, in accordance with a state of use of the power supply unit, at an end of charging of the battery through the electric power acquirer.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

As described in JP-A No. H08-065815, sometimes an electric device is used while a high-voltage battery is being charged. In this case, continuous use of the electric device after an end of the charging with the battery fully charged may cause a decrease in a state of charge of the high-voltage battery. Thus, afterwards, there is expected a restart of the charging of the high-voltage battery.

In general, at a start of the charging, a relay of an electric power acquirer is switched from a disconnected state to a connected state. In the switching of the relay, it is preferable that the high-voltage battery be disconnected from a power supply line, to prevent the relay from being damaged by a rush current. However, the disconnection of the high-voltage battery during the use of the electric device may cause interruption of electric power supply to the electric device, resulting in impairment of convenience.

It is desirable to provide a vehicle that makes it possible to suppress impairment of convenience in using an electric device, at a restart of charging during continuous use of the electric device after an end of the charging.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 1:
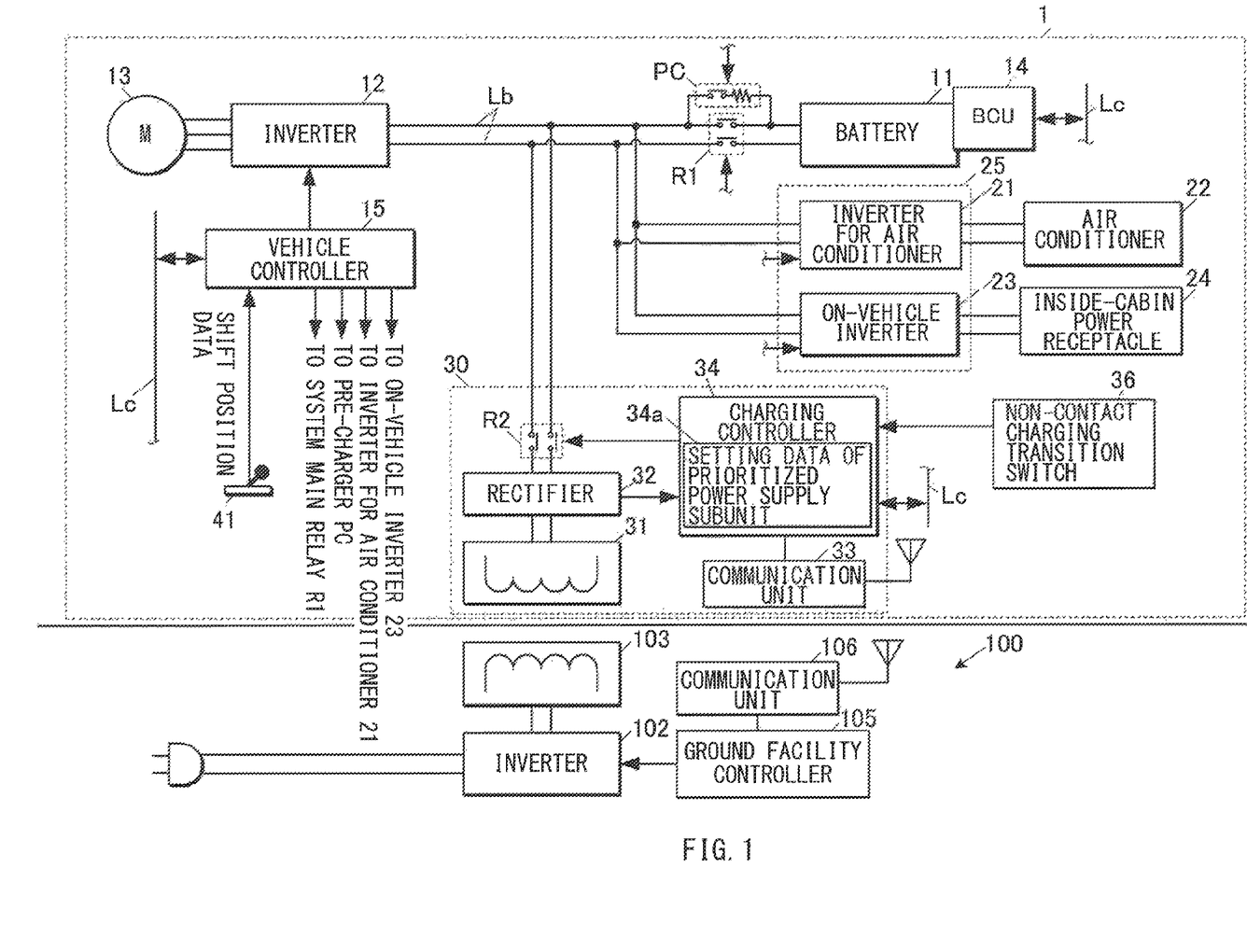
FIG. 1 is a block diagram illustrating a vehicle according to an embodiment of the technology.

FIG. 1 is a block diagram illustrating a vehicle according to an embodiment of the technology.

A vehicle 1 according to an embodiment of the technology may be, for example, an electric vehicle (EV) and a hybrid electric vehicle (HEV). The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay R1, a pre-charger PC, and a power supply line Lb. The battery 11 may be coupled to the power supply line Lb through the system main relay R1 and the pre-charger PC. The pre-charger PC may bring voltages at both ends of the system main relay R1 slowly closer to each other, with the system main relay R1 in a disconnected state. To connect the battery 11 to the power supply line Lb, first, the pre-charger PC may be switched to a connected state, thereby reducing a potential difference between both ends of the system main relay R1. Thereafter, the system main relay R1 may be switched to a connected state and the pre-charger PC may be switched to a disconnected state. This makes it possible to switch the system main relay R1 from the disconnected state to the connected state, without an excessive current flowing through the system main relay R1. Hereinafter, description that the system main relay R1 is switched to the connected state is assumed to include the forgoing switching operation of the pre-charger PC.

In one embodiment of the technology, the system main relay R1 may serve as a "first relay".

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. For example, the vehicle controller 15 may drive the inverter 12 to cause powering operation or regenerative operation of the traveling motor 13, in accordance with an operation of a driving operation unit, e.g., an undepicted pedal and a shift lever 41. This leads to the travel of the vehicle 1 in accordance with a driving operation. In addition, the vehicle controller 15 may perform a start-up control of a power supply unit 25 and a switching control of the system main relay R1 and the pre-charger PC.

The vehicle 1 may further include the power supply unit 25. The power supply unit 25 is able to supply a power supply voltage to an electric device other than the traveling motor 13, using electric power of the battery 11. The power supply unit 25 may include, for example, an inverter for air conditioner 21, an on-vehicle inverter 23, and an undepicted heater switch. The inverter for air conditioner 21 may convert electric power of the battery 11 and send a driving current to the air conditioner 22, that is, for example, to a compressor. The on-vehicle inverter 23 may convert electric power of the battery 11 into an AC power supply voltage, and output the AC power supply voltage to an inside-cabin power receptacle 24. An occupant of the vehicle 1 may drive the on-vehicle inverter 23, and thereby be able to couple, for example, a home electric appliance to the inside-cabin power receptacle 24 and use the home electric appliance. To the heater switch, coupled may be a positive temperature coefficient (PTC) heater as a load. The PTC heater may heat air conditioning coolant or the battery 11. Turning on the heater switch causes electric power supply to the PTC heater.

Instead of the inside-cabin power receptacle 24, or in addition to the inside-cabin power receptacle 24, a vehicle exterior power receptacle or an indoor power receptacle may be coupled to the on-vehicle inverter 23. The vehicle exterior power receptacle or the indoor power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power supply line Lb to the inverter in accordance with a control by the vehicle controller 15, causing an AC power supply voltage to be outputted from the external inverter to the vehicle exterior power receptacle. Alternatively, the AC power supply voltage may be outputted from the external inverter to a household power receptacle. A configuration of supplying the AC power supply voltage from the vehicle 1 to vehicle exterior may be V2L (Vehicle to Load), and a configuration of supplying the AC power supply voltage from the vehicle 1 to indoor may be V2H (Vehicle to Home). With such a configuration, it is possible for a user of the vehicle 1 to use an electric appliance near the vehicle 1 or at home, using electric power supplied from the vehicle 1.

The vehicle 1 may further include a non-contact charging mechanism 30. The non-contact charging mechanism 30 may acquire electric power non-contact from ground facilities 100. The non-contact charging mechanism 30 may include a power receiving coil 31, a rectifier 32, a communication unit 33, a charging controller 34, and a charging relay R2. The communication unit 33 may perform wireless communication. The power receiving coil 31 may receive electric power from a power transmitting coil 103 of the ground facilities 100 by electromagnetic coupling or electromagnetic resonance in an opposed state to the power transmitting coil 103. The rectifier 32 may rectify an AC current outputted from the power receiving coil 31 and send the rectified AC current toward the power supply line Lb. The charging relay R2 may switch the rectifier 32 and the power supply line Lb between a connected state and a disconnected state.

In one embodiment of the technology, the charging relay R2 may serve as a "second relay". In one embodiment of the technology, the power receiving coil 31 and the rectifier 32 may serve as an "electric power acquirer". In one embodiment of the technology, the charging controller 34 may serve as a "controller" and a "determination unit".

The charging controller 34 may communicate with the ground facilities 100 through the communication unit 33, and receive voltage data from the rectifier 32, to perform a control of non-contact charging. The control of the non-contact charging may include a switching control of the charging relay R2. The charging controller 34 may perform communication through a communication line Lc and cooperate with the vehicle controller 15 and the BCU 14. That is, the charging controller 34 is able to perform the switching control of the system main relay R1 through the vehicle controller 15. Moreover, the charging controller 34 is able to acquire data regarding various driving operations by the occupant and state data of the battery 11, through the vehicle controller 15 and the BCU 14. The data regarding the various driving operations may include position data of the shift lever 41, e.g., a parking mode, a drive mode, and a reverse mode. The state data of the battery 11 may include a state of charge (SOC).

The charging controller 34 may include an ECU including a central processing unit (CPU), a storage, and a random access memory (RAM). The storage may hold control programs to be executed by the CPU and control data. The RAM is provided for expansion of data by the CPU. The storage may hold setting data 34a of a prioritized power supply subunit. The setting data 34a of the prioritized power supply subunit may include classification of the power supply unit 25 into two kinds of subunits: a prioritized power supply subunit interruption of electric power supply to which may cause inconvenience, e.g., the on-vehicle inverter 23; and an unprioritized power supply subunit interruption of electric power supply to which is permissible, e.g., the inverter for air conditioner 21 and the heater switch. The prioritized power supply subunit and the unprioritized power supply subunit may be set by, for example, an administrator in a manufacturer or a dealer of the vehicle 1, or alternatively, the prioritized power supply subunit and the unprioritized power supply subunit may be set by the user. In the following, described is an example in which, as described above, the on-vehicle inverter 23 may be set as the prioritized power supply subunit while the inverter for air conditioner 21 and the undepicted heater switch may be set as the unprioritized power supply subunit. To the on-vehicle inverter 23, an electric device interruption of electric power supply to which causes inconvenience may be possibly coupled.

The vehicle 1 may further include a non-contact charging transition switch 36. The non-contact charging transition switch 36 may be provided on, for example, a dashboard. The occupant of the vehicle 1 may operate the non-contact charging transition switch 36, to give the charging controller 34 a command to make a transition to the non-contact charging.

It is to be noted that because the vehicle controller 15 and the charging controller 34 cooperate by the communication through the communication line Lc, part of processing of the vehicle controller 15 illustrated in the example of FIG. 1, e.g., the switching control of the system main relay R1, may be performed by the charging controller 34. Conversely, part of processing of the charging controller 34 illustrated in the example of FIG. 1, e.g., signal input from the non-contact charging transition switch 36 and the switching control of the charging relay R2, may be performed by the vehicle controller 15. Moreover, the vehicle controller 15 and the charging controller 34 do not have to be separate from each other, but may be unified as a unitary controller.

The ground facilities 100 may include the power transmitting coil 103, an inverter 102, a communication unit 106, and a ground facility controller 105. The power transmitting coil 103 may transmit electric power in a non-contact manner. The inverter 102 may convert electric power from an external power supply and output converted electric power to the power transmitting coil 103. The communication unit 106 is able to communicate with the charging controller 34 of the vehicle 1. The ground facility controller 105 may perform a drive control of the inverter 102. The charging controller 34 of the vehicle 1 is able to send a request for excitation of the power transmitting coil 103 to the ground facility controller 105 by wireless communication of the communication units 33 and 106.

<Non-Contact Charging Processing>

Described first is normal non-contact charging processing. The non-contact charging processing may be started by an operation of the non-contact charging transition switch 36 when the vehicle 1 is in the vicinity of the ground facilities 100. At the start of the non-contact charging processing, first, the charging controller 34 may execute transition processing to the non-contact charging. The transition processing to the non-contact charging may include causing the vehicle 1 to make a transition to a state in which the vehicle 1 is available for electric power reception from the ground facilities 100. In the transition processing to the non-contact charging, in a case where alignment of the power receiving coil 31 and the power transmitting coil 103 has not been made yet, the charging controller 34 may start alignment processing of the power receiving coil 31.

In the alignment processing, the charging controller 34 may request of the ground facilities 100 low excitation for alignment. On this request, the low excitation of the power transmitting coil 103 may be performed. Thereafter, while monitoring induced electromotive force generated in the power receiving coil 31, the charging controller 34 may induce the driver to move the vehicle 1, causing the alignment of the power receiving coil 31 at an opposed position to the power transmitting coil 103. The alignment of the power receiving coil 31 may be executed, with the system main relay R1 in the connected state, and with the charging relay R2 in the disconnected state.

When the alignment of the power receiving coil 31 is completed and the vehicle 1 stops, the charging controller 34 may make a relay switching control to bring both the system main relay R1 and the charging relay R2 to the connected state. For example, in a case with the charging relay R2 in the disconnected state, the charging controller 34 may switch the system main relay R1 to the disconnected state, switch the charging relay R2 to the connected state, and switch the system main relay R1 to the connected state, successively. With such a switching control, it is possible to suppress an excessive current such as a rush current from flowing through the charging relay R2.

After completing the alignment of the power receiving coil 31 and the relay switching control, the charging controller 34 may request of the ground facilities 100 for electric power transmission for the charging. This causes the electric power transmission from the power transmitting coil 103 to the power receiving coil 31. Electric power received by the power receiving coil 31 may be rectified by the rectifier 32. The resultant electric power thus rectified may be transmitted to the battery 11 through the power supply line Lb. Furthermore, at this occasion, in a case where the power supply unit 25 is in use, electric power may be transmitted from the power supply line Lb to the power supply unit 25. During the electric power transmission, the charging controller 34 may monitor, for example, charging time, the state of charge of the battery 11, and presence or absence of the electric power transmission. In a case with a lapse of predetermined charging time, or in a case where the battery 11 becomes fully charged, the charging controller 34 may determine that it is time to end the electric power transmission.

<Termination Processing of Non-Contact Charging>

Figure 2:
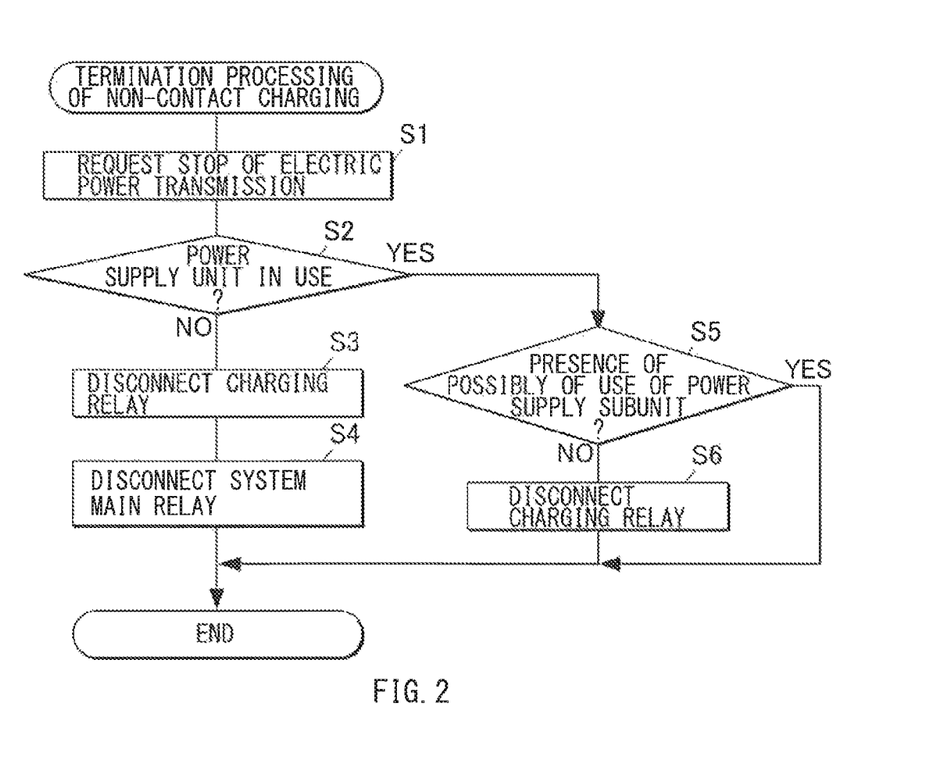
FIG. 2 is a flowchart illustrating a procedure of termination processing of non-contact charging to be executed by a charging controller.

FIG. 2 is a flowchart illustrating a procedure of termination processing of the non-contact charging to be executed by the charging controller 34. Determining that it is time to end the electric power transmission, the charging controller 34 may start the termination processing of the non-contact charging in FIG. 2. The charging controller 34 may request of the ground facilities 100 a stop of the electric power transmission (step S1). On the request for the stop, the excitation of the power transmitting coil 103 is stopped. Thereafter, the charging controller 34 may make an inquiry to the vehicle controller 15 to determine whether or not the power supply unit 25 is in use (step S2). As a result of the determination, in a case where the power supply unit 25 is out of use (step S2: NO), the charging controller 34 may switch the charging relay R2 to the disconnected state (step S3), switch the system main relay R1 to the disconnected state through the vehicle controller 15 (step S4), and end the termination processing of the non-contact charging. It is to be noted that steps S3 and S4 may be in a reverse order, or alternatively, steps S3 and S4 may be executed concurrently.

Meanwhile, as a result of the determination in step S2, in a case with a determination that the power supply unit 25 is in use (step S2: YES), the charging controller 34 may determine presence or absence of possibility of use of the prioritized power supply subunit, e.g., the on-vehicle inverter 23 (step S5). In one specific but non-limiting example, the charging controller 34 may determine the presence or the absence of the possibility of the use of the prioritized power supply subunit during a period from the time of the determination to an end of the system of the vehicle 1. The end of the system of the vehicle 1 means that the occupant makes an operation for the end of the system, using a start-up button of the vehicle 1, causing the system main relay R1 to be switched to the disconnected state and causing the vehicle controller 15 to make a transition to a standby mode. In this embodiment, the on-vehicle inverter 23 may be set as the prioritized power supply subunit. Accordingly, if the occupant stays inside the vehicle cabin, there is possibility that the on-vehicle inverter 23 is driven to provide an unspecified electric device with a power supply. Thus, the charging controller 34 may execute determination processing of step S5 as to the possibility of the use of the prioritized power supply subunit, in accordance with whether or not the occupant stays on the vehicle 1. The charging controller 34 is able to determine whether or not the occupant stays on the vehicle 1 in accordance with, for example, whether or not an electronic key of an immobilizer is in the vehicle cabin, an output of an undepicted vehicle weight sensor, operation history of the shift lever 41, operation history of a side brake, history of opening and closing of doors, and wearing of seatbelts, and images of an inside of the vehicle cabin captured by an undepicted camera.

In the determination processing of step S5, in a case where the prioritized power supply subunit, e.g., the on-vehicle inverter 23, is in use at the moment, the charging controller 34 may naturally determine the presence of the possibility of the use of the prioritized power supply unit (step S5: YES).

In a case where no occupant stays in the vehicle cabin, which leads to a determination of the absence of the possibility of the use of the prioritized power supply subunit (step S5: NO), the charging controller 34 may switch the charging relay R2 to the disconnected state (step S6), and end the termination processing of the non-contact charging.

As a result of the determination processing of step S5, in a case with a determination of the presence of the possibility of the use of the prioritized power supply subunit, e.g., the on-vehicle inverter 23 (step S5: YES), the charging controller 34 may end the termination processing of the non-contact charging, with both the system main relay R1 and the charging relay R2 kept in the connected state.

It is to be noted that in the termination processing of the non-contact charging, in a case where the non-contact charging is ended, with the system main relay R1 kept in the connected state, the vehicle controller 15 may switch the system main relay R1 to the disconnected state, upon an afterward operation by the occupant for the end of the system of the vehicle 1. In a case where the non-contact charging is ended, with the system main relay R1 and the charging relay R2 kept in the connected state, the charging controller 34 may switch the charging relay R2 to the disconnected state, upon an afterward operation by the occupant for the end of the system of the vehicle 1. Hence, it is possible to suppress, after the end of the system, a high voltage of the battery 11 from being unnecessarily outputted to, for example, the power supply line Lb or the power receiving coil 31.

Moreover, in the termination processing of the non-contact charging, in a case where the non-contact charging is ended, with the system main relay R1 and the charging relay R2 kept in the connected state, the charging controller 34 may switch the charging relay R2 to the disconnected state, on the basis of an afterward operation of the shift lever 41 by the occupant to a drive position or a reverse position. Hence, it is possible to suppress, on the travel of the vehicle 1, the high voltage of the battery 11 from being unnecessarily outputted to the power receiving coil 31.

It is to be noted that the processing of steps S5 and S6 in FIG. 2 may be replaced with processing of disconnecting the charging relay R2, in a case with little or no possibility of the use of the prioritized power supply subunit until a lapse of the predetermined time. In a case where the power supply unit 25 is in use at the end of the charging and no occupants stay in the vehicle cabin, no changes are expected in a state of the vehicle 1 for a while. Accordingly, providing delay time until the disconnection of the charging relay R2 hardly causes any adverse influence because of the delay. Furthermore, in such a case, the occupant is expected to come back to the vehicle cabin afterwards. Prolonging the predetermined time to provide the delay makes it possible to cope with an afterward case with higher possibility of the use of the prioritized power supply subunit, e.g., the on-vehicle inverter 23.

Moreover, even after the disconnection of the charging relay R2 in step S6, the charging controller 34 may continuously repeat the determination as to the presence or the absence of the possibility of the use of the prioritized power supply subunit. In a case with a change from the determination of the absence of the possibility of the use of the prioritized power supply subunit to the determination of the presence of the possibility of the use of the prioritized power supply subunit, the charging controller 34 may perform a control of switching the charging relay R2 to the connected state. In switching the charging relay R2 to the connected state, adopted may be a sequence as follows, to hinder an excessive current flow through the charging relay R2. The sequence may include, for example, disconnecting the system main relay R1 once, connecting the charging relay R2 in this state, and thereafter, connecting the system main relay R1. Alternatively, adopted may be a method, if any, of switching the charging relay R2 to the disconnected while protecting the charging relay R2, with the system main relay R1 kept in the connected state.

Meanwhile, in a case with frequent switching between the determination of the presence of the possibility of the use of the prioritized power supply subunit and the determination of the absence of the possibility of the use of the prioritized power supply subunit, the forgoing control may cause frequent operation of connection and disconnection of the system main relay R1 and the charging relay R2. This may contribute early deterioration of the relays. Thus, in the case with the charging relay R2 switched to the disconnected state in step S6, the charging controller 34 may perform a control as follows. The charging controller 34 may repeat not the determination as to the presence or the absence of the possibility of the use of the prioritized power supply subunit, but a determination as to whether or not the prioritized power supply subunit has been in actual use. In a case where the prioritized power supply unit has been in actual use, the charging controller 34 may switch the charging relay R2 to the connected state. Such a control makes it possible to suppress the frequent operation of the connection and the disconnection of the system main relay R1 and the charging relay R2. Moreover, in the case with the operation for the use of the prioritized power supply subunit, the charging controller 34 may cause a delay in supply of a power supply voltage to the prioritized power supply subunit, and during the delay, perform the switching control of the charging relay R2.

<Transition Processing to Non-Contact Charging>

Figure 3:
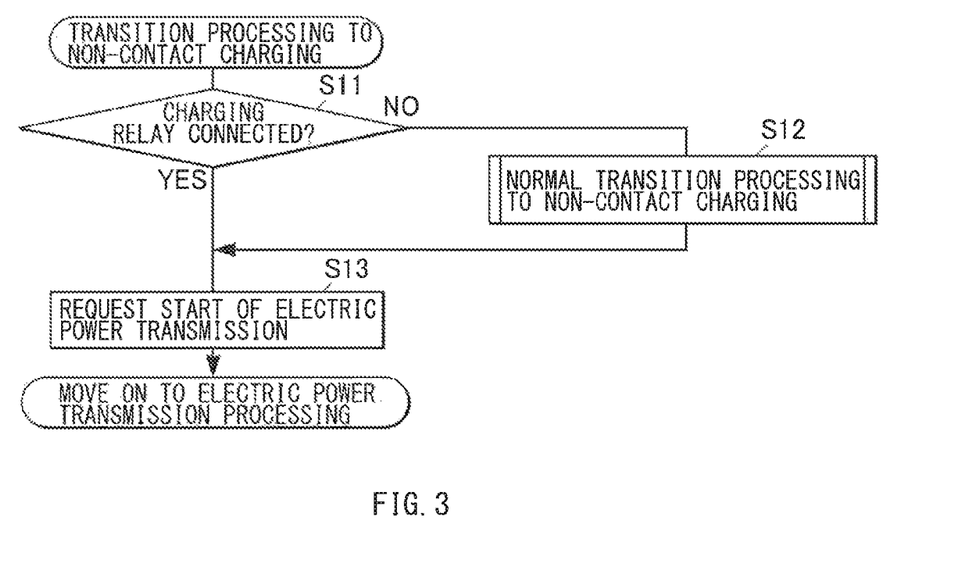
FIG. 3 is a flowchart illustrating a procedure of transition processing to the non-contact charging to be executed by the charging controller.

FIG. 3 is a flowchart illustrating a procedure of transition processing to the non-contact charging to be executed by the charging controller 34. It is to be noted that the transition processing to the non-contact charging including the forgoing alignment processing of the power receiving coil 31 and the relay switching control corresponds to the normal transition processing to the non-contact charging of step S12 in FIG. 3. The transition processing to the non-contact charging according to this embodiment may include an additional step corresponding to a case where the charging relay R2 is kept in the connected state at the end of the non-contact charging.

The transition processing to the non-contact charging may be started with the operation of the non-contact charging transition switch 36. Thereupon, the charging controller 34 may, first, determine whether or not the charging relay R2 is in the connected state (step S11). As a result, in a case where the charging relay R2 is in the disconnected state (step S11: NO), the charging controller 34 may execute the normal transition processing to the non-contact charging as described above (step S12). Meanwhile, in a case where the charging relay R2 is in the connected state (step S11: YES), the charging controller 34 may give the ground facilities 100 a request for a start of the electric power transmission (step S13) and start the charging of the battery 11, without performing the alignment processing of the power receiving coil 31 and the relay switching control.

<Comparison>

Figure 4:
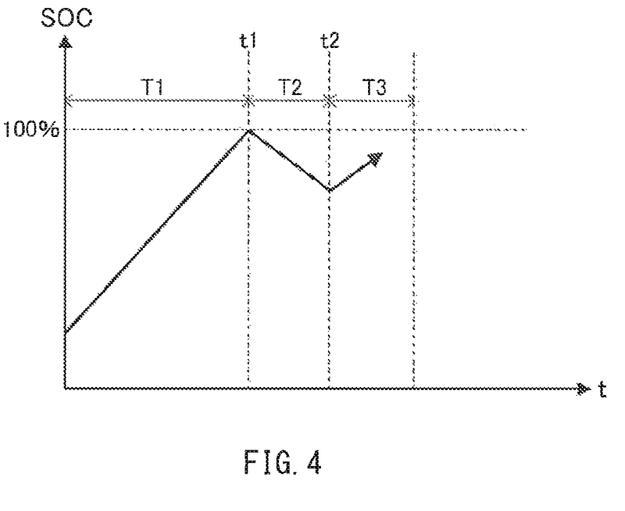
FIG. 4 is a graph that describes recharging processing.

FIG. 4 is a graph illustrating recharging processing. In the graph in FIG. 4, a vertical axis denotes the state of charge of the battery 11, and a horizontal axis denotes time. For example, it is assumed that the occupant of the vehicle 1 performs the non-contact charging while being engaged in something in the vehicle cabin. In this case, the non-contact charging is performed while the power supply unit 25 is in use for a term T1 in FIG. 4. At timing t1, the battery 11 become fully charged, and the non-contact charging is ended. But continuous use of the power supply unit 25 for a subsequent term T2 causes a decrease in the state of charge of the battery 11 again. At certain timing t2, the occupant become aware of the decrease in the state of charge, in which case the occupant sometimes operates the non-contact charging transition switch 36 to start the non-contact charging. The recharging causes restoration of the state of charge of the battery 11 in a subsequent term T3.

In the following, described is a configuration, as a first reference example, in which at the end of the non-contact charging, the system main relay R1 and the charging relay R2 are uniformly disconnected, regardless of the state of use of the power supply unit 25. In such a configuration, even in the case where the occupant is engaged in something in the vehicle cabin using the power supply unit 25, electric power supply to the power supply unit 25 would be stopped at timing t1 at the end of the non-contact charging. Thus, for example, in a case with the use of an electric device that stops upon the interruption of the electric power supply, the electric device would make an unexpected stop, which would impair the convenience of the power supply unit 25.

Described next is a configuration, as a second reference example, in which at the end of the non-contact charging, the system main relay R1 is not switched to the disconnected state but the charging relay R2 is switched to the disconnected state. In such a configuration, the end of the non-contact charging causes no interruption of the electric power supply, even if the power supply unit 25 is in use during the non-contact charging. Afterwards, however, the interruption of the electric power supply would occur in the case where, for example, the non-contact charging is performed again at timing t2 in FIG. 4. One reason is as follows. In the case where the charging relay R2 is switched from the disconnected state to the connected state, when a high voltage is outputted to the power supply line Lb, a rush current causes an excessive current flow through the charging relay R2, as described above. Accordingly, the system main relay R1 is once switched to the disconnected state. Thus, in the case with the use of the electric device the interruption of the electric power supply to which causes inconvenience, e.g., an electric device the interruption of the electric power supply to which causes it to be reset or an electric device the interruption of the electric power supply to which necessitates an end of its operation, the interruption of the electric power supply would occur upon the recharging of the battery 11, resulting in impaired convenience.

In contrast, in the termination processing of the non-contact charging in FIG. 2 according to this embodiment, in the case with the power supply unit 25 in use, the non-contact charging is ended, with the system main relay R1 kept in the connected state. Accordingly, the unexpected stop of the electric device as described above is avoided, leading to suppression of the impaired convenience. Furthermore, in the termination processing of the non-contact charging in FIG. 2 according to this embodiment, in the case with the presence of the possibility of the use of the prioritized power supply subunit, e.g., the on-vehicle inverter 23, the non-contact charging is ended, with the charging relay R2 kept in the connected state. Moreover, in the transition processing to the non-contact charging in FIG. 3 according to this embodiment, in the case with the charge relay R2 in the connected state, the request may be made instantly for the start of the electric power transmission. This hinders the interruption of the electric power supply upon the recharging of the battery 11, even in the case with the use of the electric device the interruption of the electric power supply to which causes inconvenience. This leads to the suppression in the impaired convenience of the power supply unit 25.

As described, according to the vehicle 1 of this embodiment, the charging controller 34 is configured to change the switching procedure of the system main relay R1 and the charging relay R2 at the end of the non-contact charging, in accordance with the state of use of the power supply unit 25. The state of use of the power supply unit 25 during the non-contact charging correlates with the state of use of the power supply unit 25 after the end of the non-contact charging. Accordingly, changing the switching procedure as described above makes it possible to provide the switching of the system main relay R1 and the charging relay R2 suitable for the state of use of the power supply unit 25 after the end of the charging. Hence, it is possible to suppress the impairment of the convenience of the power supply unit 25, in the case with the continuous use of the power supply unit 25 after the end of the non-contact charging, or in the case with the recharging of the battery 11 during the continuous use of the power supply unit 25.

Moreover, according to the vehicle 1 of this embodiment, in the case with the non-contact charging again, the electric power transmission for the charging may be started, without switching the states of the system main relay R1 and the charging relay R2. Hence, it is possible to restart the non-contact charging in short time, as compared with recharging in the existing techniques. Furthermore, because the recharging does not involve the switching of the system main relay R1 and the charging relay R2, it is possible to alleviate aging deterioration in the system main relay R1 and the pre-charger PC.

Moreover, according to the vehicle 1 of this embodiment, the charging controller 34 may maintain the connected state of the system main relay R1 in the case where the power supply unit 25 is in use at the end of the non-contact charging. Hence, it is possible to avoid situations such as the unexpected stop of the electric device in use at the end of the non-contact charging.

Furthermore, according to the vehicle 1 of this embodiment, the charging controller 34 may change the switching procedure of the system main relay R1 and the charging relay R2 at the end of the non-contact charging, on the basis of the state of use of the prioritized power supply subunit. The power supply unit 25 may be classified into several kinds of subunits: a power supply subunit to which a device interruption of electric power supply to which is highly permissible is expected to be coupled; a power supply subunit to which a device interruption of electric power supply to which is not highly permissible is coupled; and a power supply subunit to which such a device is possibly coupled. If the interruption of the electric power supply to a device is highly permissible, the interruption of the electric power supply after the end of the non-contact charging would not give the occupant the sense of the impaired convenience. Meanwhile, if the interruption of the electric power supply to a device is not so highly permissible, the interruption of the electric power supply after the end of the non-contact charging would give the occupant the sense of the impaired convenience. Accordingly, changing the switching procedure of the relays on the basis of the state of use of the prioritized power supply subunit makes it possible to efficiently suppress the impairment of the convenience for the occupant.

In one specific but non-limiting example, the charging controller 34 may maintain the connected state of the charging relay R2 in the case where the prioritized power supply subunit is in use at the end of the non-contact charging. This makes it possible to start the non-contact charging without disconnecting the system main relay R1, even in the case where the non-contact charging is performed again after the end of the non-contact charging. Hence, it is possible to continue the electric power supply from the prioritized power supply unit. Thus, no interruption of the electric power supply occurs in the case with the use of the device the interruption of the electric power supply to which causes inconvenience. Hence, it is possible to suppress the impairment of the convenience of the power supply unit 25.

Furthermore, according to the vehicle 1 of this embodiment, at the end of the non-contact charging, the charging controller 34 may determine the presence or the absence of the possibility of use of the prioritized power supply subunit. In the case with the presence of the possibility of use, the charging controller 34 may maintain the connected state of the charging relay R2. Accordingly, there is no interruption of the electric power supply from the prioritized power supply subunit, in the case where the prioritized power supply subunit is in use after the end of the non-contact charging, and thereafter, the non-contact charging is executed again. Hence, it is possible to suppress the impairment of the convenience of the power supply unit 25.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, the forgoing embodiment exemplifies a configuration with an "electric power acquirer" of the technology configured to perform non-contact electric power transmission. However, the "electric power acquirer" of the technology may be configured to transmit electric power from an external power supply by wired connection. For example, in a vehicle that acquires a DC power supply voltage from outside and charges a battery, the "electric power acquirer" to which the DC power supply voltage is inputted may have a configuration in which the power receiving coil and the rectifier in the non-contact charging mechanism are replaced with a wired power line and the communication unit is replaced with a communication unit of a wired method. Otherwise, the "electric power acquirer" may include substantially similar constituent elements to those of the non-contact charging mechanism. Accordingly, in vehicles that charge a battery from a DC power supply by wired connection, the similar configurations and control methods as those of the forgoing embodiment make it possible to prevent the interruption of the electric power supply, leading to the suppression of the impairment of the convenience of the power supply unit 25.

Further, in the forgoing embodiment, described is an example in which the determination of the presence of the possibility of the use of the prioritized power supply subunit may be made, in the case where the occupant stays in the vehicle cabin. However, various techniques may be applicable to the determination as to the presence or the absence of the possibility of the use of the prioritized power supply subunit. Non-limiting examples of the techniques may include learning habits for each user from, for example, a place where the charging was performed, time of the charging, the day of the week, weather data, to determine the possibility of the use of the prioritized power supply subunit on the basis of a result of the learning. In addition, the details described in the forgoing embodiment may be appropriately changed insofar as the changes fall within a range not departing from the scope of the technology.

According to the aspect of the technology, a controller is configured to change a switching procedure of a first relay and a second relay at an end of charging, in accordance with a state of use of a power supply unit. The state of use of the power supply unit during the charging or at the end of the charging correlates with the state of use of the power supply unit after the end of the charging. Accordingly, changing the switching procedure as described above makes it possible to provide the switching of the first relay and the second relay suitable for the state of use of the power supply unit after the end of the charging. This makes it possible to provide the switching of the first relay and the second relay that prevents interruption of electric power supply to the power supply unit, in a case with, for example, a restart of charging of a battery in order to restore a state of charge of the battery that has decreased by the use of the power supply unit after the end of the charging. Hence, it is possible to suppress impairment of convenience of the power supply unit, in the case with the restart of the charging together with continuous use of an electric device after the end of the charging.

It is to be noted that the term "to change a switching procedure" as used in this specification is a concept including changing a target of switching, changing contents of switching, or changing an order of switching, or any combination thereof.

The charging controller 34 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the charging controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the charging controller 34 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle, comprising:
   a battery configured to accumulate electric power for travel of the vehicle;
   an electric power acquirer configured to acquire charging electric power from outside;
   a power supply unit able to provide a power supply from the battery to a device other than a traveling motor;
   a first relay configured to connect the battery to a power supply line or to disconnect the battery from the power supply line;
   a second relay configured to connect the electric power acquirer to the power supply line or to disconnect the electric power acquirer from the power supply line; and
   a controller configured to change a switching procedure of the first relay and the second relay, in accordance with a state of use of the power supply unit, at an end of charging of the battery through the electric power acquirer.

2. The vehicle according to claim 1, wherein at the end of the charging, the controller
   continues a connected state of the first relay on a condition that the power supply unit is in use, and
   switches the first relay to a disconnected state on a condition that the power supply unit is out of use.

3. The vehicle according to claim 2, wherein the power supply unit includes:
   a prioritized power supply subunit set as a prioritized power supply; and
   an unprioritized power supply subunit set as a power supply having lower priority than the prioritized power supply subunit, and
   at the end of the charging, the controller further changes the switching procedure of the first relay and the second relay, on a basis of a state of use of the prioritized power supply subunit.

4. The vehicle according to claim 3, wherein at the end of charging, the controller
   continues a connected state of the second relay on a condition that the prioritized power supply subunit is in use, and
   switches the second relay to a disconnected state on a condition that the prioritized power supply subunit is out of use.

5. The vehicle according to claim 4, further comprising a determination unit configured to determine possibility of use of the prioritized power supply subunit,
   wherein at the end of the charging, the controller
   continues a connected state of the second relay on a condition that the determination unit determines presence of the possibility of use of the prioritized power supply subunit, and
   switches the second relay to a disconnected state on a condition that the determination unit determines absence of the possibility of use of the prioritized power supply subunit.

6. The vehicle according to claim 3, further comprising a determination unit configured to determine possibility of use of the prioritized power supply subunit,
   wherein at the end of the charging, the controller
   continues a connected state of the second relay on a condition that the determination unit determines presence of the possibility of use of the prioritized power supply subunit, and
   switches the second relay to a disconnected state on a condition that the determination unit determines absence of the possibility of use of the prioritized power supply subunit.

7. The vehicle according to claim 1, wherein the power supply unit includes:
   a prioritized power supply subunit set as a prioritized power supply; and
   an unprioritized power supply subunit set as a power supply having lower priority than the prioritized power supply subunit, and
   at the end of the charging, the controller further changes the switching procedure of the first relay and the second relay, on a basis of a state of use of the prioritized power supply subunit.

8. The vehicle according to claim 7, wherein at the end of charging, the controller continues a connected state of the second relay on a condition that the prioritized power supply subunit is in use, and switches the second relay to a disconnected state on a condition that the prioritized power supply subunit is out of use.

9. The vehicle according to claim 8, further comprising a determination unit configured to determine possibility of use of the prioritized power supply subunit, wherein at the end of the charging, the controller continues a connected state of the second relay on a condition that the determination unit determines presence of the possibility of use of the prioritized power supply subunit, and switches the second relay to a disconnected state on a condition that the determination unit determines absence of the possibility of use of the prioritized power supply subunit.

10. The vehicle according to claim 7, further comprising a determination unit configured to determine possibility of use of the prioritized power supply subunit, wherein at the end of the charging, the controller continues a connected state of the second relay on a condition that the determination unit determines presence of the possibility of use of the prioritized power supply subunit, and switches the second relay to a disconnected state on a condition that the determination unit determines absence of the possibility of use of the prioritized power supply subunit.

\* \* \* \* \*